(12) United States Patent
Kubo

(10) Patent No.: US 7,666,062 B2
(45) Date of Patent: Feb. 23, 2010

(54) GRINDING APPARATUS WITH MAGNETIC BEARINGS

(75) Inventor: Atsushi Kubo, Matsubara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 12/076,212

(22) Filed: Mar. 14, 2008

(65) Prior Publication Data

US 2008/0233851 A1    Sep. 25, 2008

(30) Foreign Application Priority Data

Mar. 15, 2007    (JP) ............................. 2007-066020

(51) Int. Cl.
*B24B 49/00*    (2006.01)
*B24B 51/00*    (2006.01)

(52) U.S. Cl. .................. 451/5; 451/9; 451/10; 451/360

(58) Field of Classification Search ................ 310/90.5; 451/5, 9, 11, 178, 294, 342, 360, 363, 10; 340/680

See application file for complete search history.

(56) References Cited

U.S. PATENT DOCUMENTS

| | | | |
|---|---|---|---|
| 4,180,946 A | | 1/1980 | Heijkenskjold et al. |
| 4,956,945 A | * | 9/1990 | Ooshima ........................ 451/1 |
| 5,027,280 A | * | 6/1991 | Ando et al. .................. 700/174 |
| 5,133,158 A | * | 7/1992 | Kihara et al. .................. 451/11 |
| 5,205,078 A | * | 4/1993 | Takara et al. .................. 451/11 |
| 5,562,528 A | * | 10/1996 | Ueyama et al. ............... 451/11 |
| 5,573,443 A | * | 11/1996 | Yasuda et al. ................. 451/11 |
| 5,772,564 A | | 6/1998 | Taniguchi et al. |
| 6,183,342 B1 | * | 2/2001 | Watanabe et al. ............... 451/5 |
| 6,404,088 B1 | * | 6/2002 | Barada et al. .............. 310/90.5 |
| 6,508,614 B1 | * | 1/2003 | Ozaki et al. .................. 409/231 |
| 6,653,756 B2 | * | 11/2003 | Ueyama et al. ............ 310/90.5 |
| 2008/0246358 A1 | * | 10/2008 | Kubo ........................ 310/90.5 |

FOREIGN PATENT DOCUMENTS

| | | |
|---|---|---|
| EP | 0 333 352 A2 | 9/1989 |
| EP | 0 595 070 A1 | 4/1994 |
| JP | 57-27660 | 2/1982 |
| JP | 2001-159421 | 6/2001 |

OTHER PUBLICATIONS

European Search Report dated Jul. 3, 2008.

* cited by examiner

*Primary Examiner*—Timothy V Eley
(74) *Attorney, Agent, or Firm*—McGinn IP Law Group PLLC

(57) ABSTRACT

A grinding wheel having a convex grinding surface is attached to a wheel spindle that is contactlessly supported by a casing through a controlled type axial magnetic bearing and controlled type radial magnetic bearings and that is rotated by an electric motor. A groove of a workpiece is ground by causing relative displacement of the casing. After the axial positioning of the casing is performed, the casing is radially displaced. Then, the groove is ground. The stiffness value of the axial magnetic bearing 6 is set to be lower than a normal value before the casing is radially displaced. After it is detected that the grinding surface of the grinding wheel touches the entire groove of the workpiece and that the grinding of the entire surface of the workpiece is started, the stiffness value is set back to the normal value.

12 Claims, 7 Drawing Sheets

GRINDING APPARATUS WITH MAGNETIC BEARINGS

BACKGROUND OF THE INVENTION

The present invention relates to a grinding apparatus for grinding a groove in a cylindrical peripheral surface of a workpiece with a grinding wheel in which a convex grinding surface is formed on the outer peripheral surface.

Internal cylindrical grinding machines are known as grinding apparatuses for performing finish grinding on raceway grooves formed in inner peripheral surfaces of outer rings of ball bearings.

Conventional internal cylindrical grinding machines have used contact type rolling bearings as bearings for rotationally supporting a wheel spindle, on which a grinding wheel is mounted, on a casing of a spindle apparatus (see, e.g., JP-A-2001-159421 and JP-A-57-27660).

As described above, the conventional internal cylindrical grinding machine for performing finish grinding on a groove formed on the inner peripheral surface of the outer ring of the ball bearing uses the rolling bearing for rotationally supporting a wheel spindle. Thus, the conventional internal cylindrical grinding machine has the following problems that have occurred when grinding a raceway groove of the outer ring.

In the case of performing finish grinding on the raceway groove of the outer ring using the internal cylindrical grinding machine, a work (workpiece) in which a groove is formed on the inner peripheral surface in the preceding process, is rotated in a state in which the work is grasped by a gasping device, such as a chuck. In addition, a casing is positioned in an axial direction of the wheel spindle. Subsequently, the casing is radially moved so as to bring the grinding wheel into contact with the work and as to grind the groove.

At that time, in a case where there is no error in the axial position of the groove formed in the inner peripheral surface of the work in the preceding process, no problems are caused. However, in a case where an error in the axial position exists, and where the axial position of the groove is deviated from a correct axial position, a part of the grinding surface of the grinding wheel is extremely worn away. That is, what is called a grinding wheel wear occurs, so that the life of the grinding wheel is shortened.

For example, in a case where the position of a groove R of a work W is correct, as illustrated in FIG. 7A, the grinding surface S of a grinding wheel G is substantially simultaneously put into contact with the entire groove R when a casing is radially moved. Thus, the grinding surface S is not locally worn away. On the other hand, in a case where the position of the groove R is axially shifted to the left, as viewed in FIG. 7B, only the right-side edge of the groove R is put into contact with the grinding surface S of the grinding wheel and is ground when the casing is radially moved. Consequently, only a part of the grinding surface S of the grinding wheel, which is contacted with the right-side edge of the groove R, is locally worn away. Similarly, in a case where the position of the groove R is axially shifted to the right side, as viewed in FIG. 7C, only a part of the grinding surface S of the grinding wheel, which is contacted with the left-side edge of the groove R, is locally worn away.

Similar problems occur in the case of grinding a groove formed in a cylindrical peripheral surface (i.e., an inner peripheral surface or an outer peripheral surface) of a work, in addition to the case of performing finish grinding on the raceway groove of the inner peripheral surface of the outer ring.

SUMMARY OF THE INVENTION

An object of the invention is to solve the aforementioned problems and to provide a grinding apparatus configured so that a grinding wheel wear is hard to occur even when an axial position of a groove formed in a peripheral surface of a work is deviated.

According to a first aspect of the invention, there is provided a grinding apparatus for grinding a workpiece comprising:

a casing relatively movable with respect to the workpiece;

a wheel spindle that is contactlessly supported with respect to the casing;

a controlled type axial magnetic bearing provided at the casing for contactlessly supporting the wheel spindle in an axial direction thereof;

a controlled type radial magnetic bearing provided at the casing for contactlessly supporting the wheel spindle in a radial direction thereof;

an electric motor that rotates the wheel spindle; and a grinding wheel that is attached to the wheel spindle and includes a convex grinding surface for grinding a groove formed on a cylindrical peripheral surface of the workpiece, wherein after the casing is axially positioned with respect to the workpiece, the grinding wheel grinds the workpiece while the casing is radially moved with respect to the workpiece, wherein before the casing is put into contact with the workpiece when the casing is radially moved toward the workpiece, a stiffness value of the axial magnetic bearing is set to be lower than a normal value, and wherein when it is detected that the grinding surface of the grinding wheel touches the entire groove of the workpiece and the entire surface of the workpiece is started to be ground, the stiffness value of the axial magnetic bearing is set to the normal value.

Each of the cross-sections of the convex grinding surface of the grinding wheel and that of the groove of the workpiece has a curved shape as a whole.

The term "cross-section" of each of the grinding surface of the grinding wheel and the groove of the workpiece designates a cross-section (longitudinal cross-section) taken along a plane including an axis line of the wheel spindle and an axis line of the cylindrical peripheral surface in which a groove is formed. When the groove is ground, the axis line of the wheel spindle and that of a cylindrical peripheral surface of the workpiece, in which the groove is formed, are parallel to each other.

It is detected according to, e.g., change in exciting current supplied to electromagnets of the radial magnetic bearings that the grinding surface of the grinding wheel touches the entire workpiece and that the grinding of the enter groove is started.

In a case where the groove is formed at a correct position by the preprocessing, and where the position of the groove coincides with that in the axial direction of the grinding wheel, the grinding surface of the grinding wheel substantially simultaneously touches the entire groove when the casing is radially moved so as to cause the grinding wheel to come close to the work. Then, the stiffness value of the axial magnetic bearing is set back to the normal value after it is detected that the grinding surface S of the grinding wheel touches the entire groove, and that the grinding of the entire groove is started. When the casing is radially moved, the grinding surface of the grinding wheel substantially simultaneously touches the entire groove. Accordingly, the local wear of the grinding surface of the grinding wheel is not caused.

In a case where the position of the groove formed by the preprocessing is shift leftwardly, first, only the right-side edge of the groove touches the grinding surface of the grinding wheel when the casing is radially moved so as to cause the grinding wheel to come close to the work. Consequently, the wheel spindle is subjected to a leftward force. At that time, the stiffness value of the axial magnetic gearing is lower than a normal value. Thus, the wheel spindle leftwardly moves away, so that the grinding surface of the grinding wheel touches the entire groove. After it is detected that the grinding surface of the grinding wheel touches the entire groove, and that the grinding of the entire groove is started, the stiffness value of the axial magnetic bearing is set back to the normal value. Because the grinding surface of the grinding wheel touches first the right-side edge of the groove, so that the grinding wheel G moves away, the grinding wheel G can be prevented from grinding only the edge of the groove. Thus, the local wear of the grinding surface does not occur.

This is the same with a case where the position of the groove formed by the preprocessing is axially and rightwardly shifted.

When the grinding surface of the grinding wheel touches the entire groove, and when the grinding of the entire groove is started, a reaction force applied to the wheel spindle rearwardly in an infeed direction is increased. An excitation current supplied to the electromagnet, which is placed frontwardly in the infeed direction of the radial magnetic bearing, is increased. Accordingly, it is detected due to the excitation current for the electromagnet of the radial magnetic bearing that the grinding surface of the grinding wheel touches the entire groove and that the grinding of the entire groove is started.

According to a second aspect of the invention, there is provided a grinding apparatus for grinding a workpiece comprising:

a casing relatively movable with respect to the workpiece;

a wheel spindle that is contactlessly supported with respect to the casing;

a controlled type axial magnetic bearing provided at the casing for contactlessly supporting the wheel spindle in an axial direction thereof;

a controlled type radial magnetic bearing provided at the casing for contactlessly supporting the wheel spindle in a radial direction thereof;

an electric motor that rotates the wheel spindle; and a grinding wheel that is attached to the wheel spindle and includes a convex grinding surface for grinding a groove formed on a cylindrical peripheral surface of the workpiece, wherein after the casing is axially positioned with respect to the workpiece, the grinding wheel grinds the workpiece while the casing is radially moved with respect to the workpiece, wherein when an axial displacement of the wheel spindle with respect to the casing is detected when the casing is radially moved toward the workpiece, an axial levitation target position is changed from a normal target position to a position displaced in the direction of the detected axial displacement, wherein when the wheel spindle is not displaced axially with respect to the casing at the time the grinding wheel touches the workpiece, the axial levitation target position is set to the normal target position.

In a case where the groove is formed at a correct position by the preprocessing, and where the position of the groove coincides with that in the axial direction of the grinding wheel, the grinding surface of the grinding wheel substantially simultaneously touches the entire groove when the casing is radially moved so as to cause the grinding wheel to come close to the work. Thus, when the grinding wheel touches the work, the wheel spindle is not displaced axially with respect to the casing, so that grinding is performed while the wheel spindle remains supported at the normal target position. Further, when the grinding wheel touches the work, the grinding surface of the grinding wheel substantially simultaneously touches the entire groove. Accordingly, the local wear of the grinding surface of the grinding wheel is not caused.

In a case where the position of the groove formed by the preprocessing is shift leftwardly, first, only the right-side edge of the groove touches the grinding surface of the grinding wheel when the casing is radially moved so as to cause the grinding wheel to come close to the work. Consequently, the wheel spindle is subjected to a leftward force and is moved leftwardly. Thus, the axial levitation target position of the wheel spindle is changed from the normal target position to a left-side position. Further, after the casing comes not to axially move with respect to the wheel spindle when the grinding wheel touches the work, the axial levitation target position of the wheel spindle is set back to the normal target position. Accordingly, the grinding wheel can be prevented from grinding only the edge of the groove. Thus, the local wear of the grinding surface does not occur.

This is the same with a case where the position of the groove formed by the preprocessing is axially and rightwardly shifted.

According to a third aspect of the invention, in the second aspect, before the casing is put into contact with the workpiece when the casing is radially moved toward the workpiece, a stiffness value of the axial magnetic bearing is set to be lower than a normal value, and when the wheel spindle is not displaced axially with respect to the casing at the time the grinding wheel touches the workpiece, the stiffness value of said axial magnetic bearing is set to the normal value.

In this case, even when the position of the groove formed in the preprocessing is axially shifted and when only an edge of the groove touches the grinding surface of the grinding wheel, the wheel spindle moves away, similarly to the case of the first aspect of the invention. Consequently, the local wear of the grinding surface of the grinding wheel can more effectively be prevented.

As described above, according to the grinding apparatus of the invention, even when the axial position of a groove formed in a peripheral surface of a work is deviated, a grinding wheel wear is difficult to occur. Consequently, the local wear of the grinding wheel can be prevented.

DETAILED DESCRIPTION OF PREFERRED EMBODIMENTS

Hereinafter, an embodiment of the invention is described with reference to the accompanying drawings.

Figure 1:
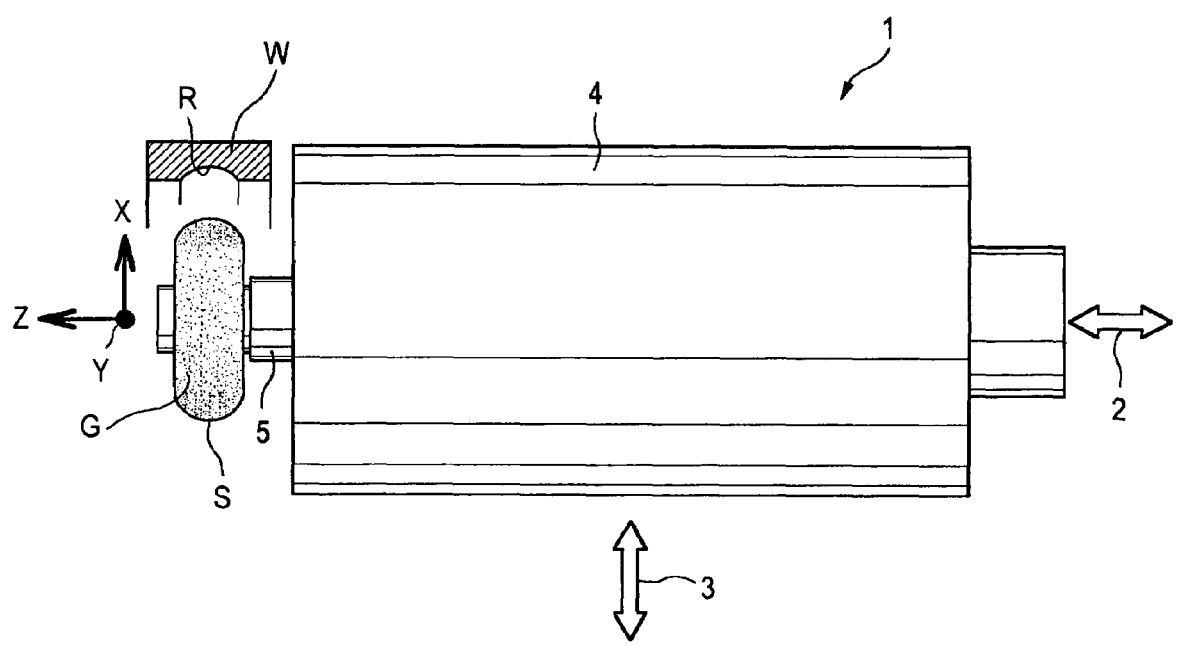
FIG. 1 is a side view of a primary part of a grinding apparatus according to an embodiment of the invention.
Figure 2:
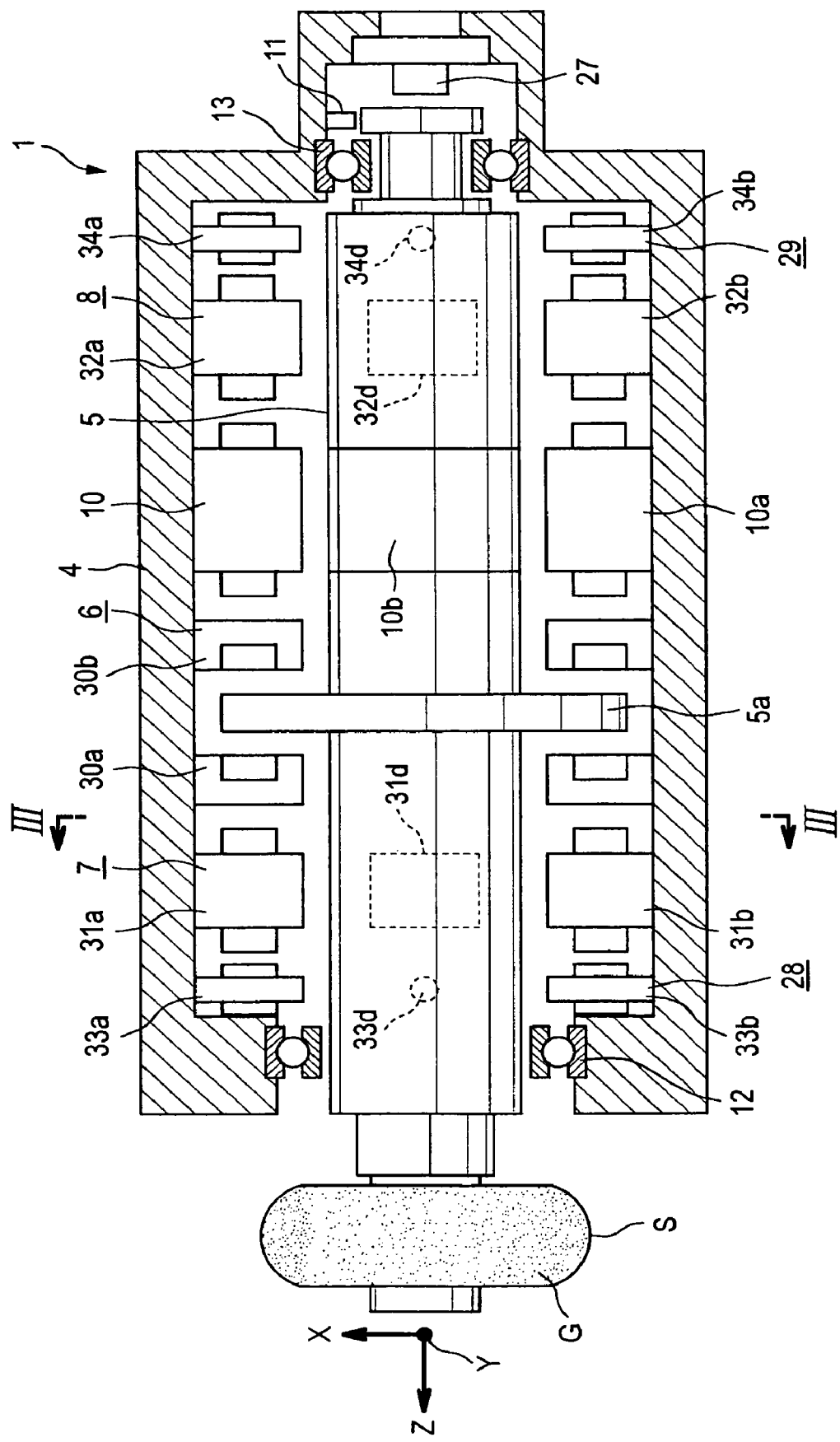
FIG. 2 is an enlarged longitudinal cross-sectional view taken from the same direction as that of FIG. 1, showing the grinding apparatus shown in FIG. 1.
Figure 3:
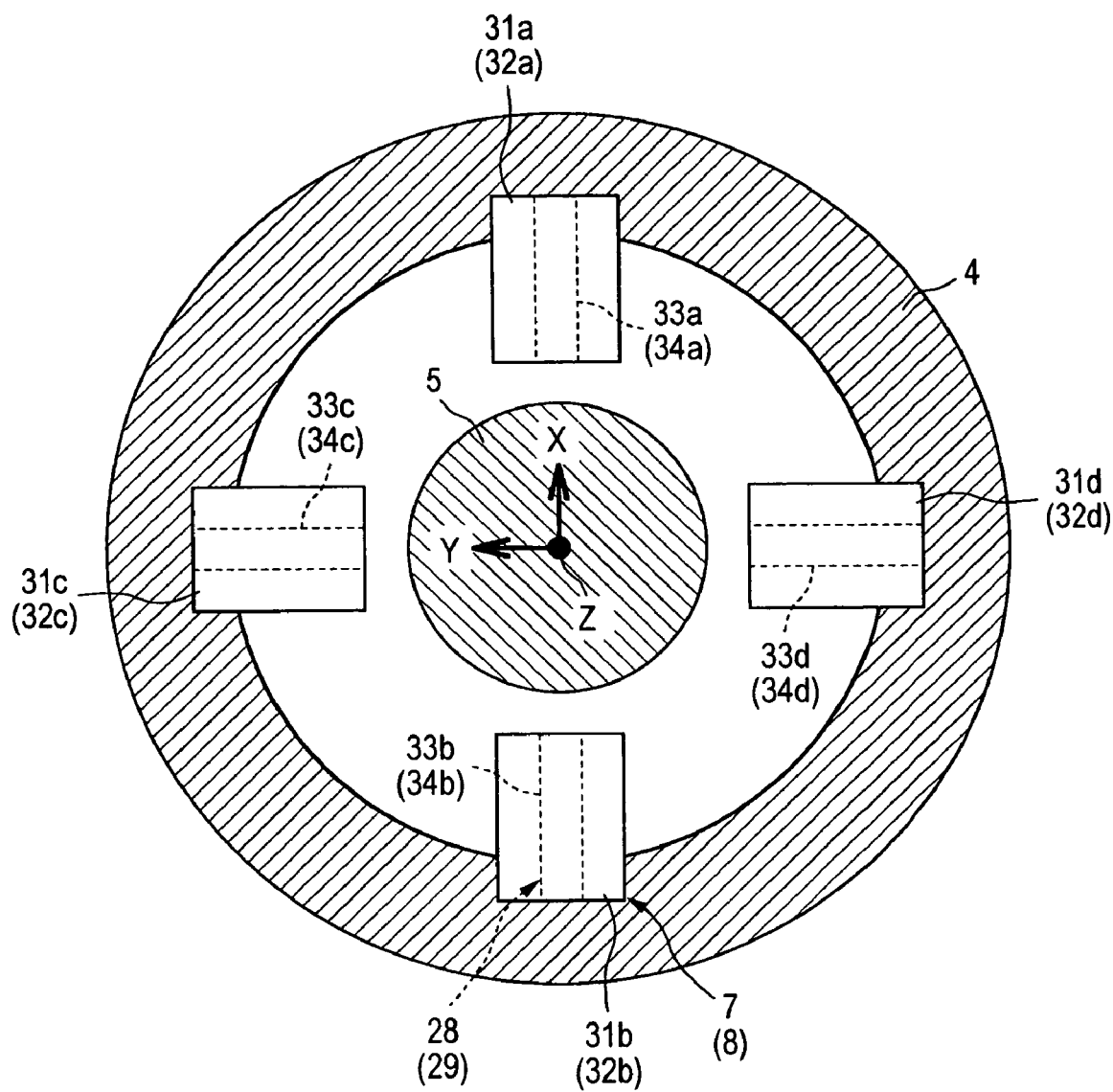
FIG. 3 is an enlarged cross-sectional view (transversal cross-sectional view) taken along line III-III shown in FIG. 2.
Figure 4:
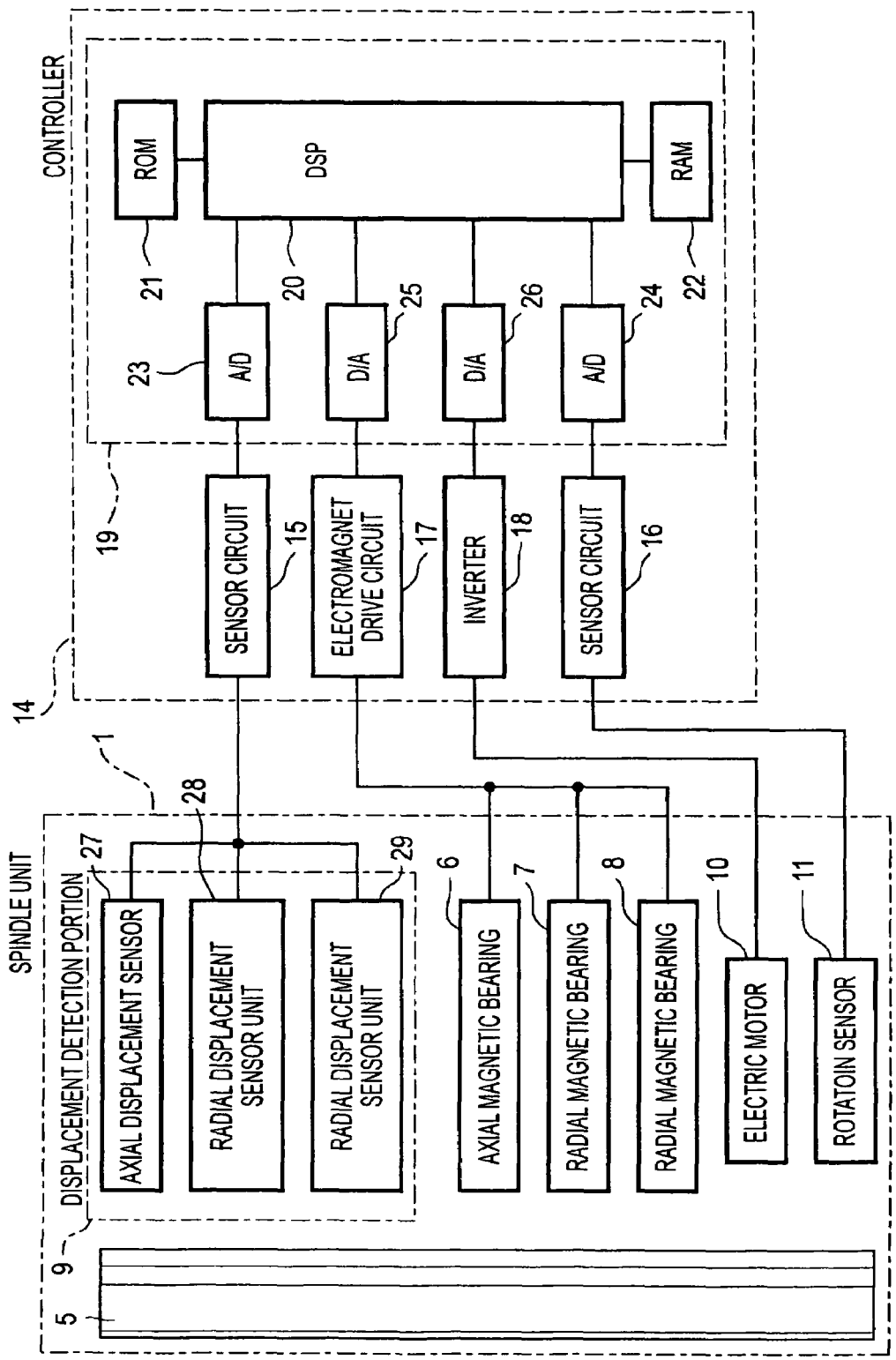
FIG. 4 is a block diagram showing a primary part of the electrical configuration of the grinding apparatus shown in FIG. 2.

FIG. 1 is a side view illustrating a part of a magnetic bearing spindle unit that is a primary part of a grinding apparatus according to the invention. FIG. 2 is an enlarged cross-sectional view of the magnetic bearing spindle unit. FIG. 3 is a cross-sectional view taken along line III-III shown in FIG. 2. FIG. 4 is a block diagram illustrating a primary part of the electrical configuration of the spindle unit.

In the following description, it is assumed that an up-down direction as viewed in FIGS. 1 and 2 corresponds to an "up-down direction" of the grinding apparatus, that the left side as viewed in FIGS. 1 and 2 corresponds to a front side thereof, that the right side as viewed in FIGS. 1 and 2 corresponds to a rear side thereof, and that the left side and the right side, which are viewed from the rear side to the front side, correspond to the left side and the right side of the grinding apparatus, respectively. Therefore, the left side and the right side as viewed in FIG. 3 correspond to the left side and the right side of the grinding apparatus, respectively.

Although not described in detail in FIGS. 1 to 4, a spindle unit 1 is moved in an anteroposterior direction by a front-rear drive device 2, and is moved in an up-down direction by an up-down drive device 3 independent of each other. Thus, the spindle unit 1 is positioned at an intended place. The displacement in the anteroposterior direction, the displacement in the up-down direction, and the positioning of the spindle unit 1 are controlled by a known numerical control apparatus (not shown).

The spindle unit 1 is of the horizontal type in which a horizontal wheel spindle 5 rotates in a horizontal casing 4. The spindle unit 1 is disposed so that a direction, along which the wheel spindle 5 extends, is the anteroposterior direction.

A control axis (i.e., an axial control axis) in an axial direction, i.e., the anteroposterior direction of the wheel spindle 5 is a Z-axis. Of control axes respectively corresponding to two radial directions, which are perpendicular to each other and to the Z-axis, the control axis corresponding to the up-down direction is an X-axis, while the control axis corresponding to the lateral direction is a Y-axis. A positive side of the Z-axis is a front side. A positive side of the X-axis is an upper side. A positive side of the Y-axis is a left side.

The spindle unit 1 includes one controlled type axial magnetic bearing 6 which contactlessly and axially supports the wheel spindle 5, two front and rear controlled type radial magnetic bearings 7 and 8 which contactlessly and radially support the wheel spindle 5, a displacement detection portion 9 for detecting an axial displacement and radial displacements of the wheel spindle 5, a built-in type electric motor 10 for rotating the wheel spindle 5 at high speed, a rotation sensor 11 for detecting the number of revolutions of the wheel spindle 5, and two front and rear touchdown (or protection) bearings 12 and 13 for regulating axial and radial ranges of movement of the wheel spindle 5 and for mechanically supporting the wheel spindle 5 when the wheel spindle 5 is not supported by the magnetic bearings 6, 7, and 8.

A controller 14 for controlling the magnetic bearings 6, 7, and 8, and the electric motor 10 is electrically connected to the spindle unit 1 via cables. A magnetic bearing device for contactlessly supporting the wheel spindle 5 against the casing 4 includes the spindle unit 1 and the controller 4.

The controller 14 includes sensor circuits 15 and 16, electromagnet drive circuits 17, an inverter 18 and a digital signal processor DSP board 19. The DSP board 19 includes a DSP 20 serving as a digital processing means capable of executing software programs, a read-only memory (ROM) 21, a random access memory (RAM) 22 serving as a nonvolatile memory, analog-to-digital (AD) converters 23 and 24 and digital-to-analog (DA) converters 25 and 26.

The displacement detection portion 9 includes one axial displacement sensor 27 for detecting an axial displacement of the wheel spindle 5, and two front and rear radial displacement sensor units 28 and 29 for detecting radial displacements of the wheel spindle 5.

The axial magnetic bearings 6 includes a pair of front and rear axial electromagnets 30a and 30b disposed so as to sandwich a flange portion 5a formed integrally with an intermediate part of the wheel spindle 5 from opposite sides in the Z-direction. The axial electromagnets are generically designated by reference numeral 30.

The axial displacement sensor 27 is disposed so as to face the rear end surface of the wheel spindle 5 rearwardly in the Z-axis. The axial displacement sensor 27 outputs a distance signal whose signal level is proportional to a distance therefrom to the rear end surface of the wheel spindle 5 (or to the dimension of an air-gap there between).

The front-side radial magnetic bearing 7 is disposed at a place close to the front side of the axial magnetic bearing 6. The rear-side radial magnetic bearing 8 is disposed at a place away from the rear side of the axial magnetic bearing 6. The front-side radial magnetic bearing 7 includes a pair of upper and lower radial electromagnets 31a and 31b, which are disposed so as to sandwich the wheel spindle 5 from both sides in the X-direction, and a pair of left-side and right-side radial electromagnets 31c and 31d which are disposed so as to sandwich the wheel spindle 5 from both sides in the Y-direction. These radial electromagnets are generically designated by reference numeral 31. Similarly, the rear-side radial magnetic bearing 8 includes two pairs of radial electromagnets 32a, 32b, 32c, and 32d. These radial electromagnets are generically designated by reference numeral 32.

The front-side radial displacement sensor unit 28 is disposed just in front of the front-side radial magnetic bearing 7. The front-side radial displacement sensor unit 28 includes a pair of upper and lower radial displacement sensors 33a and 33b, and a pair of left-side and right-side radial displacement sensors 33c and 33d. The pair of upper and lower radial displacement sensors 33a and 33b are disposed in the vicinity of the electromagnets 31a and 31b for the X-axis, respectively, so as to sandwich the wheel spindle 5 from both sides in the X-direction. The pair of left-side and right-side radial displacement sensors 33c and 33d are disposed in the vicinity of the electromagnets 31c and 31d for the Y-axis, respectively, so as to sandwich the wheel spindle 5 from both sides in the Y-direction. These radial displacement sensors are generically designated by reference numeral 33. The rear-side radial displacement sensor unit 29 is disposed just in rear of the rear-side radial magnetic bearing 8. Similarly, the rear-side radial displacement sensor unit 29 includes two pairs of radial displacement sensors 34a, 34b, 34c, and 34d. These radial displacement sensors are generically designated by reference numeral 34. Each of the radial displacement sensors 33 and 34 outputs a distance signal whose signal level is proportional to a distance therefrom to the outer peripheral surface of the wheel spindle 5.

The electric motor 10 is disposed between the axial magnetic bearing 6 and the rear-side radial magnetic bearing 8, and includes a stator 10a provided at the side of the casing 4, and a rotor 10b provided at the side of the wheel spindle 5.

The electromagnets 30, 31, and 32, the displacement sensors 27, 28, and 29, and the stator 10a of the electric motor 10 are fixed to the casing 4.

Each of the protection bearings 12 and 13 includes rolling bearings such as angular ball bearings. Outer rings of the protection bearings 12 and 13 are fixed to the casing 4. Inner rings thereof are arranged around the wheel spindle 5 at predetermined intervals. The two protection bearings 12 and 13 can radially support the wheel spindle 5. At least one of the protection bearings 12 and 13 can axially support the wheel spindle 5.

The sensor circuit 15 drives the displacement sensors 27, 33, and 34 of the displace detection portion 9, and outputs an output signal of each displacement sensor to the DSP 20 via the AD converter 23.

The sensor circuit 16 drives the rotation sensor 11, converts an output of the rotation sensor 11 into a rotation number signal corresponding to the number of revolutions of the wheel spindle 5, and outputs the rotation number signal to the DSP 20 via the AD converter 24.

The DSP 20 obtains a control current value for each of the displacement sensors 27, 33, and 34 according to an output signal of each of the displacement sensors 27, 33, and 34 of the magnetic bearings 6, 7, and 8, which is input thereto via the AD converter 23. The DSP 20 outputs to the electromagnet drive circuit 17 via the DA converter 25 an excitation current signal representing an electric current value obtained by adding the control current value to a constant stationary current value. Then, the drive circuit 17 supplies an excitation current to an associated one of the electromagnets 30, 31, and 32 of the magnetic bearings 6, 7, and 8 according to the excitation current signal output from the DSP 20. Consequently, the wheel spindle 5 is contactlessly supported at the intended levitation target position. The DSP 20 outputs to the inverter 18 via the DA converter 26 a rotation number command signal for the electric motor 10 according to the rotation number signal output from the rotation sensor 11. The inverter 18 controls the number of rotations of the electric motor 10 according to the rotation number command signal. As a result, the wheel spindle 5 is rotated at high speed by the electric motor 10 in a state in which the wheel spindle 5 is contactlessly supported at the target position by the magnetic bearings 6, 7, and 8.

Each of the stiffness value and the levitation target position of the axial magnetic bearing 6 can optionally be changed within a predetermined range.

The front portion of the wheel spindle 5 protrudes frontwardly from the casing 4. The grinding wheel G is fixed to the front end part of the wheel spindle 5.

In the case of grinding the groove R formed in the inner peripheral surface of the work W, such as the raceway groove in the outer peripheral surface of the ball bearing, the grinding wheel G in which grinding surface S whose sectional shape is curved convex is formed on the outer peripheral surface is attached to the wheel spindle 5.

In the case of grinding the groove R formed in the inner peripheral surface of the work W as illustrated in FIG. 1 by the grinding apparatus, the casing 4 is moved in the direction of the Z-axis. Then, the casing 4 is positioned at a place at which the grinding surface S of the grinding wheel G faces the groove R. Subsequently, the casing 4 is moved in the positive direction along the X-axis (i.e., an infeed direction) at a predetermined infeed speed.

At that time, the apparatus performs mainly a control method of controlling the axial magnetic bearing 6 so as to prevent occurrence of what is called a grinding wheel wear. Two examples of the control method are described below.

According to a first control method, the casing 4 is moved in the positive direction along the X-axis. The stiffness value of the axial magnetic bearing 6 is set to be lower than a normal value before the grinding wheel G touches the work W. Then, after the apparatus detects that the grinding surface S of the grinding wheel touches the entire groove R of the work W, and that the grinding of the groove R is started, the stiffness value of the axial magnetic bearing 6 is set back to the normal value.

Next, the first control method is described in detail with reference to a flowchart illustrated in FIG. 5.

Figure 5:
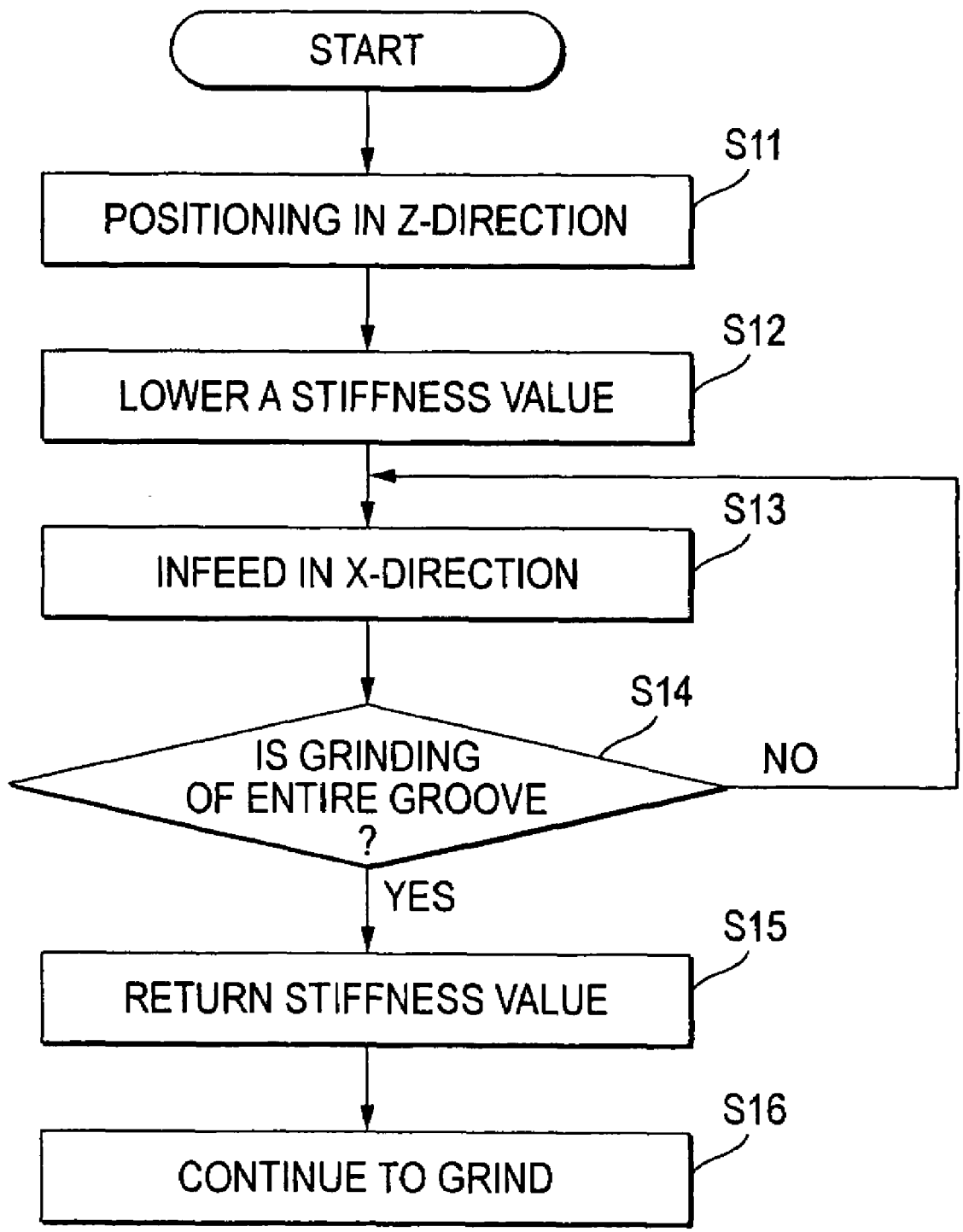
FIG. 5 is a flowchart showing an example of a control method for the grinding apparatus.

As illustrated in FIG. 5, first, the positioning in the Z-axis of the casing 4 is performed in step S11. The stiffness value of the axial magnetic bearing 6 is set in step S12 to be lower than the normal value. The casing 4 is moved in the positive direction along the Z-axis. Then, infeed is started in step S13. Further, it is determined in step S14 whether the grinding surface S of the grinding wheel touches the entire groove R of the work W, and that the grinding of the entire groove R is started. The starting of the grinding of the entire groove R can be detected by change in the excitation current supplied to the pair of electromagnets 31a and 31b arranged in the direction of the X-axis of the radial magnetic bearings 7 and 8. If it is found in step S14 that the grinding of the entire groove R is not started, the apparatus returns to step S13 in which the infeed is continued. If it is detected in step S14 that the grinding of the entire groove R is started, the apparatus advances to step S15 in which the stiffness value of the axial magnetic bearing 6 is set back to the initial normal value. Then, in step S16, the infeed is continued so as to continue the grinding.

The infeed is continued in a state, in which the stiffness value of the axial magnetic bearing 6 is set to be lower than the normal value, since the infeed is started until it is detected that the grinding of the entire groove R is started. In a case where the position of the grinding surface S of the grinding wheel in the direction of the Z-axis does not coincide with the position of the groove R in the direction of the Z-axis, the grinding surface S touches one of the edges of the groove R during the infeed. However, because the stiffness value of the axial magnetic bearing 6 is lower than the normal value, the wheel spindle 5 moves away in a direction in which the position of the grinding surface S of the grinding wheel in the direction of the Z-axis coincides with the position of the groove R in the direction of the Z-axis. Thus, the grinding wheel G can be prevented from grinding only the edge of the groove R. Consequently, what is called a grinding wheel wear, i.e., the local wear of the grinding surface S does not occur.

According to a second control method, the casing 4 is moved in the positive direction along the X-axis. The stiffness value of the axial magnetic bearing 6 is set to be lower than a normal value before the grinding wheel G touches the work W. When the grinding surface S of the grinding wheel touches the groove R of the work W, the apparatus detects a direction of displacement of the wheel spindle 5 in the direction of the Z-axis with respect to the casing 4. Then, a levitation target position the wheel spindle 5 in the direction of the Z-axis of is changed to a position of the wheel spindle 5 in the direction of displacement. After the wheel spindle 5 comes not to move in the direction of the Z-axis with respect to the casing 4 when the grinding wheel G touches the work W, the stiffness value of the axial magnetic bearing 6 is set back to the normal value. Further, the levitation target position of the wheel spindle 5 in the direction of the Z-axis is setback to the normal target position. A maximum amount of change in the levitation target position is about 10 μm. A typical amount of change in the levitation target position is, for example, about 5 μm.

Next, the second control method is described in detail with reference to a flowchart illustrated in FIG. 6.

Figure 6:
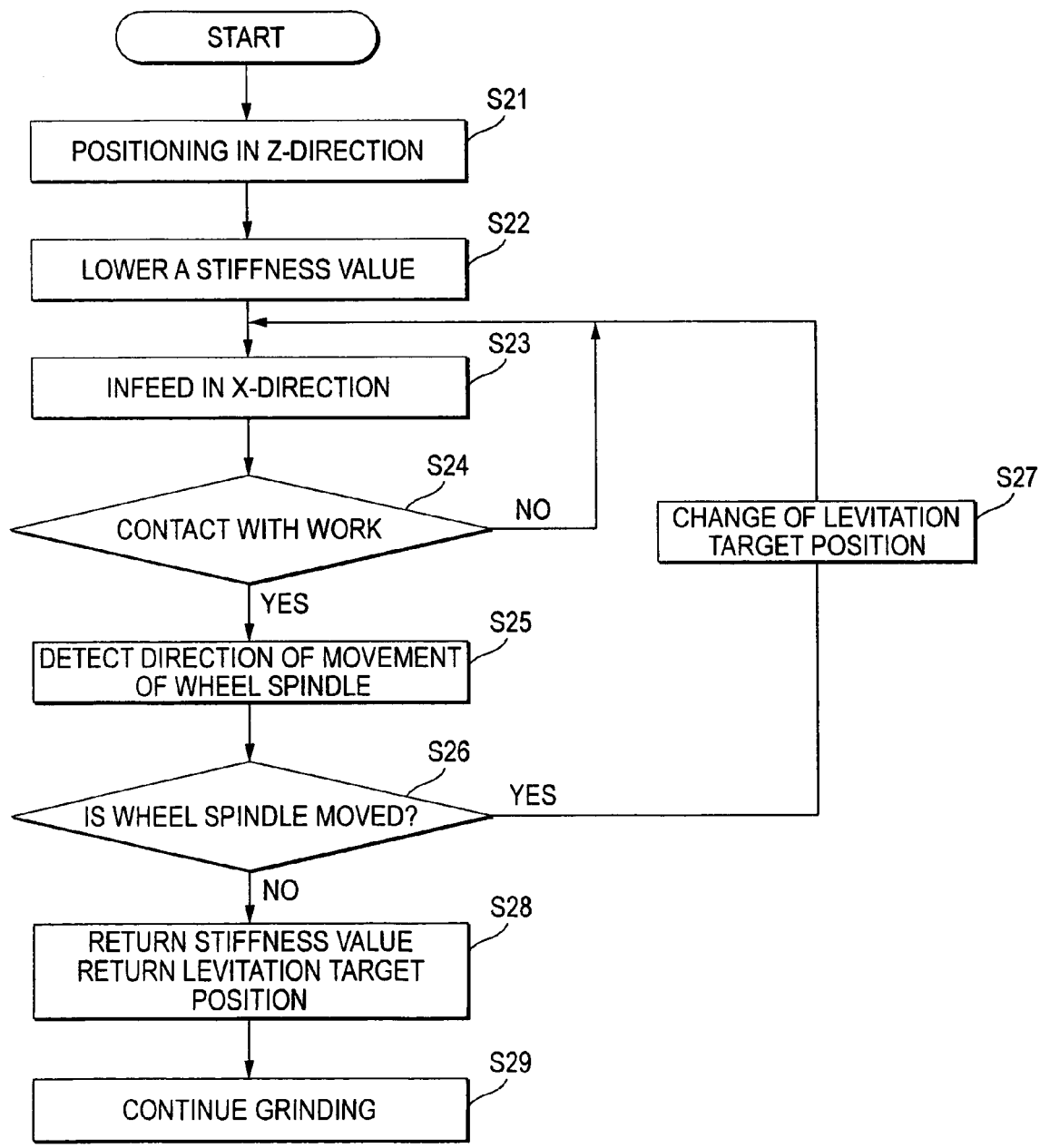
FIG. 6 is a flowchart showing another example of the control method for the grinding apparatus.
Figure 7A:
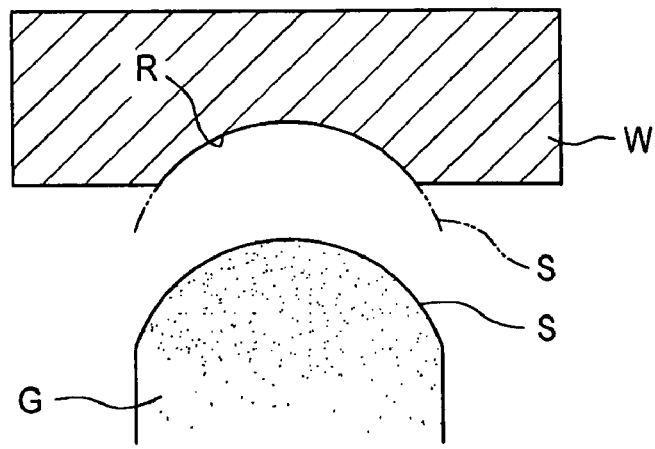
FIGS. 7A to 7C are explanatory views illustrating a manner of processing a groove of a work with a grinding wheel.
Figure 7B:
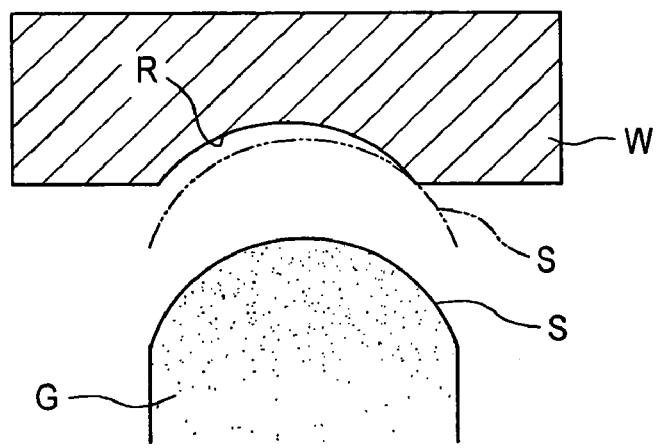
Figure 7C:
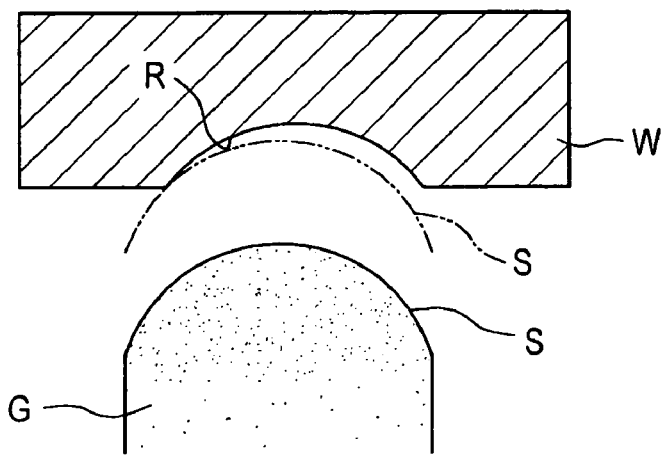

As illustrated in FIG. 6, first, the positioning of the casing 4 in the Z-axis is performed in step S21. The stiffness value of the axial magnetic bearing 6 is set in step S22 to be lower than the normal value. The casing 4 is moved in the positive direction along the Z-axis. Then, infeed is started in step S23. Subsequently, in step S24, it is determined whether the grinding wheel G touches the work W. It can be detected according to change in the excitation current supplied to the pair of electromagnets 31a and 31b arranged in the direction of the X-axis of each of the radial magnetic bearings 7 and 8 that the grinding wheel G touches the work W. If it is found in step S24 that the grinding wheel G does not touch the work W, the apparatus returns to step S23 in which the infeed is continued. If it is detected in step S24 that the grinding wheel G touches the work W, the apparatus proceeds to step S25 in which the direction of displacement of the wheel spindle 5 along the direction of the Z-axis is detected. The direction of displacement of the wheel spindle 5 can be detected according to change in the excitation current supplied to the electromagnets 30 of the axial magnetic bearing 6. Next, it is determined in step S26 whether the wheel spindle 5 is displaced in the direction of the X-axis. If displaced, the levitation target position of the wheel spindle 5 in the direction of the Z-axis is changed from the normal target position to a position in the direction of the Z-axis in step S27. Then, the apparatus returns to step S23 in which the infeed is continued. If it is found in step S26 that the wheel spindle 5 is not displaced in the direction of the Z-axis, the apparatus advances to step S28 in which the stiffness value of the axial magnetic bearing 6 is set back to the initial normal value. Further, the levitation target position of the wheel spindle 5 in the direction of the Z-axis is set back to the normal target position. Then, in step S29, the infeed remains continued so as to continue the grinding.

In a case where the position of the grinding surface S in the direction of the Z-axis does not coincide with the position of the groove R in the direction of the Z-axis, the grinding surface S touches one of the edges of the groove R during the infeed. Consequently, the wheel spindle 5 is moved in a direction in which the position of the grinding surface S in the direction of the Z-axis coincides with the position of the groove R in the direction of the Z-axis. The levitation target position of the wheel spindle 5 is changed to a position in this direction. Thus, the grinding wheel G can be prevented from grinding only the edge of the groove R. Consequently, what is called a grinding wheel wear, i.e., the local wear of the grinding surface S does not occur. Additionally, the stiffness value of the axial magnetic bearing 6 is lower than the normal value until the wheel spindle 5 comes not to move in the direction of the Z-axis with respect to the casing 4 when the grinding wheel G touches the work W. Accordingly, even when only the edge of the groove R touches the grinding surface S of the grinding wheel G during the infeed, the wheel spindle 5 moves away, similarly to the case of performing the first control method. Consequently, the local wear of the grinding surface S of the grinding wheel G due to the edge of the groove R can more effectively be prevented.

The change of the levitation target position in step S27 can be performed in a state in which the infeed is continued. Alternatively, the change of the levitation target position in step S27 can be performed in a state in which the infeed is once stopped. Thereafter, the infeed can be resumed.

The example illustrated in FIG. 6 is adapted to change the stiffness value of the axial magnetic bearing 6. However, the stiffness value of the axial magnetic bearing 6 can be fixed to a normal value.

The configuration of the entire grinding apparatus or the entire magnetic bearing device constituting the grinding apparatus and that of each of constituent portions of the grinding apparatus and the magnetic bearing device are not limited to those according to the aforementioned embodiments and can appropriately be altered.

What is claimed is:

1. A grinding apparatus for grinding a workpiece, comprising:
   a casing relatively movable with respect to the workpiece;
   a wheel spindle that is contactlessly supported with respect to the casing;
   a controlled type axial magnetic bearing provided at the casing for contactlessly supporting the wheel spindle in an axial direction thereof;
   a controlled type radial magnetic bearing provided at the casing for contactlessly supporting the wheel spindle in a radial direction thereof;
   an electric motor that rotates the wheel spindle; and
   a grinding wheel which is disposed on the wheel spindle and includes a convex grinding surface for grinding a groove formed on a cylindrical peripheral surface of the workpiece,
   wherein after the casing is axially positioned with respect to the workpiece, the grinding wheel grinds the workpiece while the casing is radially moved with respect to the workpiece,
   wherein before the casing is put into contact with the workpiece when the casing is radially moved toward the workpiece, a stiffness value of the axial magnetic bearing is set to be lower than a normal value, and
   wherein when it is detected that the grinding surface of the grinding wheel touches the entire groove of the workpiece and the entire surface of the workpiece is started to be ground, the stiffness value of the axial magnetic bearing is set to the normal value.

2. The grinding apparatus according to claim 1, further comprising a detector which detects a time when the grinding surface of the grinding wheel touches the entire groove by detecting a change in an exciting current supplied to the radial magnetic bearing.

3. The grinding apparatus according to claim 1, wherein the radial magnetic bearing comprises at least two radial magnetic bearings, which are disposed towards opposite axial ends of the spindle, and the axial magnetic bearing is disposed axially between at least two of the radial magnetic bearings.

4. The grinding apparatus according to claim 1, wherein the casing is moved in an anteroposterior direction and an up-down direction independent of each other.

5. The grinding apparatus according to claim 1, further comprising a control unit connected to the casing, which controls the axial magnetic bearing and the radial magnetic bearing.

6. The grinding apparatus according to claim 5, wherein the control unit further comprises:
   a digital signal processor;
   a displacement sensor circuit, connected to the casing and the digital signal processor;
   a rotation sensor circuit, connected to the casing and the digital signal processor;
   an electromagnetic drive circuit, connected to the casing and the digital signal processor;
   an inverter, connected to the casing and the digital signal processor;
   a read only memory connected to the digital signal processor; and a random access memory connected to the digital signal processor.

7. A grinding apparatus for grinding a workpiece, comprising:
- a casing relatively movable with respect to the workpiece;
- a wheel spindle that is contactlessly supported with respect to the casing;
- a controlled type axial magnetic bearing provided at the casing for contactlessly supporting the wheel spindle in an axial direction thereof;
- a controlled type radial magnetic bearing provided at the casing for contactlessly supporting the wheel spindle in a radial direction thereof;
- an electric motor that rotates the wheel spindle; and
- a grinding wheel which is disposed on the wheel spindle and includes a convex grinding surface for grinding a groove formed on a cylindrical peripheral surface of the workpiece,
- wherein after the casing is axially positioned with respect to the workpiece, the grinding wheel grinds the workpiece while the casing is radially moved with respect to the workpiece,
- wherein when an axial displacement of the wheel spindle with respect to the casing is detected when the casing is radially moved toward the workpiece, an axial levitation target position is changed from a normal target position to a position displaced in a direction of the detected axial displacement, and
- wherein when the wheel spindle is not displaced axially with respect to the casing at the time the grinding wheel touches the workpiece, the axial levitation target position is set to the normal target position.

8. The grinding apparatus according to claim 7, wherein before the casing is put into contact with the workpiece when the casing is radially moved toward the workpiece, a stiffness value of the axial magnetic bearing is set to be lower than a normal value, and
- wherein, when the wheel spindle is not displaced axially with respect to the casing at the time the grinding wheel touches the workpiece, the stiffness value of said axial magnetic bearing is set to the normal value.

9. The grinding apparatus according to claim 7, wherein a rotation of the wheel spindle halts during transition to the position displaced in the direction of the detected axial displacement.

10. The grinding apparatus according to claim 7, further comprising an axial displacement sensor, for detecting axial displacement of the wheel spindle, disposed as to face a rear end surface of the wheel spindle.

11. The grinding apparatus according to claim 7, further comprising a plurality of radial displacement sensors, for detecting a radial displacement of the wheel spindle.

12. The grinding apparatus according to claim 11, wherein a first radial displacement sensor is disposed on an axial side of the casing toward a location on wheel spindle on which the grinding wheel is disposed and a second radial displacement sensor is disposed on a side of the casing opposite the location on wheel spindle on which the grinding wheel is disposed.

* * * * *